R. Spear,

Pipe.

No. 95,614. Patented Oct. 5. 1869.

Witnesses
John A Ellis,
Henry N Miller

Inventor
Robt. Spear,
Per.
F. H. Alexander,
Atty.

United States Patent Office.

ROBERT SPEAR, OF NEW HAVEN, CONNECTICUT.

Letters Patent No. 95,614, dated October 5, 1869.

IMPROVEMENT IN APPARATUS FOR TRANSMITTING POWER BY MEANS OF A FLUID PASSED THROUGH A PIPE OR TUBE.

The Schedule referred to in these Letters Patent and making part of the same.

*To all whom it may concern:*

Be it known that I, ROBERT SPEAR, of New Haven, in the county of New Haven, and State of Connecticut, have invented certain new and useful Improvements in the Mode of Transmitting Power for Marine Signals, &c.; and I do hereby declare that the following is a full, clear, and exact description thereof, reference being had to the accompanying drawings, and to the letters of reference marked thereon, which form a part of this specification.

The nature of my invention relates to an improvement in transmitting motive power, and to the peculiar construction of the devices for accomplishing the same.

In order to enable others skilled in the art to which my invention appertains, to apply the same, I will now proceed to describe the construction and operation of my apparatus, referring to the annexed drawings, which make part of this specification, in which—

Figure 1:
Figure 2:

Figure 1 is a longitudinal vertical section, and
Figure 2 is a side view.

Fluids of any kind, in their passage through tubes or conduits of uniform size, gradually lose their force and velocity, to prevent which, and cause them to pass with unabated force, without regard to distance, is the object of my invention.

B represents a section of the conduit, and
A, its connection with the second joint of the tube or conduit, or its terminus when not more than one joint is used.

The length of the connecting-tubes A A is only what is required to form the connection with the main tube B, and their diameter is always equal and smaller than that of the main tube.

The pipe B can be of any desired length; the longer it is the greater must be its diameter, as compared with the connecting-tubes A A.

If the main tube is one mile long, its area should be at least one-fifth larger; if half a mile, one-tenth, and if one-quarter of a mile, only of one-twentieth larger, and continue to diminish in the same ratio.

The reason of this is obvious when it is understood that the object of this arrangement is to allow the fluid to perform the peculiar function of its nature, which is to maintain its equilibrium.

This it cannot do in its passage through a conduit of uniform size, in which no provision can be made to counteract the friction occasioned by its contact with the surface of the same.

By observing the principle already described in the construction of this novel form of conduit, it has been found, by repeated experiment, that while the fluid is in motion pressure-gauges show the same force at the point of reception and delivery, whether it be a long or short joint or an indefinite series of them, regardless of the distance the force or power is transmitted.

The pipe or conduit B acts in the capacity of a reservoir for the fluid, and it is already evident that if a certain amount of pressure is applied at one end, to force the fluid into the pipe through a smaller inlet, the fluid will escape through an outlet of the same size, with exactly the same force or velocity, and, consequently, the original power is transmitted without loss.

This mode of transmitting power is designed particularly for working marine signals, although it will work to advantage in operating engines designed for working machinery, and for all purposes where, for any reason, it may be desirable to transmit any kind of fluid for any purpose or use whatever.

When the fluid in the conduit is in a quiet state, by opening the valve at the point of delivery, signals can be made along the whole line, extending to the original power-source, whenever arrangements are made for the purpose, as has been especially proven by firing guns or operating various kinds of signals; or the same results can be produced by an attempt to negative, by opening the lateral vent, the line at any point between its terminus and the power-source, from which point signals can be made either in the direction of the power-source or the terminus of the line, while any considerable amount of force remains in the conduit, and, when desired, the terminus of the line can be connected with the constant force, by which means continued signals or results may be produced from any point on the line, in either direction.

In addition to the utility of working marine signals, for which I particularly design this form of conduit, it is also useful for other forms of signals, and for working nearly all possible forms of engines.

It therefore becomes evident that the utility of my invention must be great for numerous purposes.

Having thus fully described my invention,

What I claim as new, and desire to secure by Letters Patent, is—

1. The within-described improvement in transmitting power by means of a fluid passed through a tube or tubes, with diminished connection, substantially as described.

2. The pipe or pipes through which a fluid is transmitted from an engine or power-source to the machinery designed to be operated upon, or to the desired terminus with any form of engine, when said pipe or pipes are united with diminished connections or provided with contractions, substantially as and for the purpose set forth.

In testimony that I claim the foregoing as my own, I affix my signature, in presence of two witnesses.

ROBERT SPEAR.

Witnesses:
WM. MARTIN,
JNO. H. JOHNSON.